(12) United States Patent
Desjardins et al.

(10) Patent No.: US 10,816,007 B2
(45) Date of Patent: Oct. 27, 2020

(54) OIL TANK INSTALLATION IN GAS TURBINE ENGINE

(71) Applicant: PRATT & WHITNEY CANADA CORP., Longueuil (CA)

(72) Inventors: Michel Desjardins, St-Hubert (CA); Francis Bonacorsi, Candiac (CA); Keith Morgan, Westmount (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 611 days.

(21) Appl. No.: 15/349,281

(22) Filed: Nov. 11, 2016

(65) Prior Publication Data

US 2018/0135639 A1    May 17, 2018

(51) Int. Cl.
| | |
|---|---|
| *F04D 29/063* | (2006.01) |
| *F04D 29/54* | (2006.01) |
| *F04D 29/64* | (2006.01) |
| *F02C 7/04* | (2006.01) |
| *F01D 25/18* | (2006.01) |

(52) U.S. Cl.
CPC ........... *F04D 29/063* (2013.01); *F01D 25/18* (2013.01); *F02C 7/04* (2013.01); *F04D 29/545* (2013.01); *F04D 29/644* (2013.01); *F05D 2220/32* (2013.01)

(58) Field of Classification Search
CPC .... F04D 29/063; F04D 29/545; F04D 19/644; F01D 25/18; F02C 7/04; F05D 2220/32
See application file for complete search history.

(56) References Cited

U.S. PATENT DOCUMENTS

| | | | |
|---|---|---|---|
| 2,874,803 A | 2/1959 | Gunberg | |
| 3,692,146 A | 9/1972 | Butler | |
| 3,797,561 A * | 3/1974 | Clark | F01D 25/18 |
| | | | 60/39.08 |
| 3,810,528 A | 5/1974 | Morley et al. | |
| 4,887,424 A | 12/1989 | Geidel et al. | |
| 9,194,294 B2 | 11/2015 | Suciu et al. | |
| 10,352,191 B2 * | 7/2019 | Weiner | F01D 25/24 |
| 2005/0132984 A1 * | 6/2005 | Fuerlinger | F02B 37/00 |
| | | | 123/54.1 |
| 2011/0030385 A1 * | 2/2011 | Ellans | F02C 7/262 |
| | | | 60/786 |
| 2014/0161591 A1 * | 6/2014 | Venter | F02C 7/06 |
| | | | 415/122.1 |

(Continued)

OTHER PUBLICATIONS

Canadian Intellectual Property Office, Office Action dated Oct. 11, 2018 re: application No. 2,967,438.

*Primary Examiner* — Michael R Mansen
*Assistant Examiner* — Robert T Reese
(74) *Attorney, Agent, or Firm* — Norton Rose Fulbright Canada LLP

(57) ABSTRACT

Oil tanks for gas turbine engines and associated assembly methods are disclosed. In one exemplary embodiment, an oil tank is configured to be installed to occupy a radially-inner space defined by an annular radial air inlet duct of a reverse flow gas turbine engine. The oil tank may comprise a first tank portion and a second tank portion assembled together to cooperatively define an interior volume of the tank. An optional intermediate spacer may be disposed between the first tank portion and the second tank portion in order to form an oil tank of a larger size.

17 Claims, 7 Drawing Sheets

(56) References Cited

U.S. PATENT DOCUMENTS

| | | | |
|---|---|---|---|
| 2015/0198092 A1* | 7/2015 | Weiner | F01D 25/12 |
| | | | 415/175 |
| 2018/0016982 A1* | 1/2018 | Wotzak | B64D 27/12 |
| 2018/0135463 A1* | 5/2018 | Desjardins | F02C 7/04 |
| 2018/0193770 A1* | 7/2018 | Czajkowski | B01D 19/0052 |
| 2018/0321073 A1* | 11/2018 | Cleyet | G01F 23/22 |

* cited by examiner

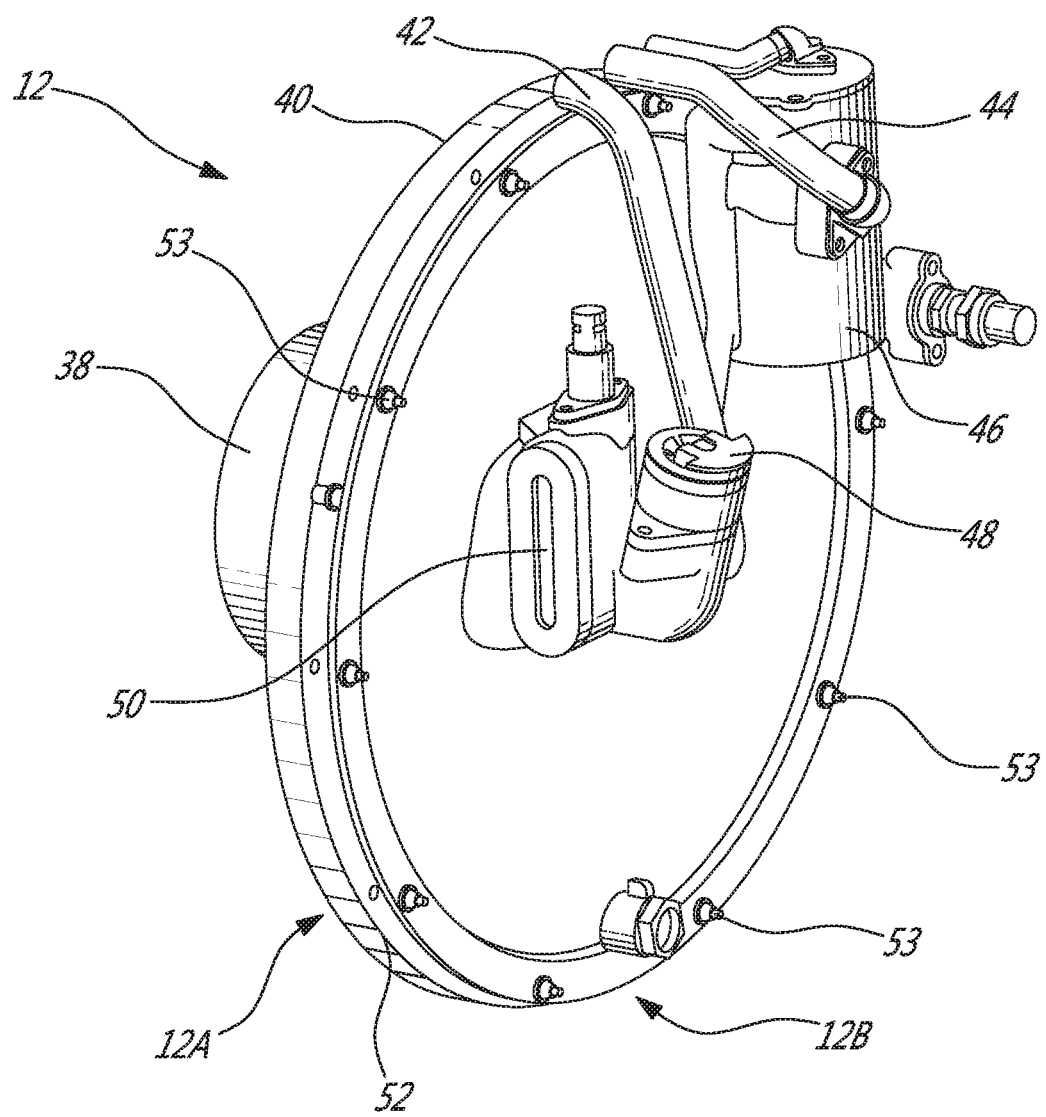
Fig_3

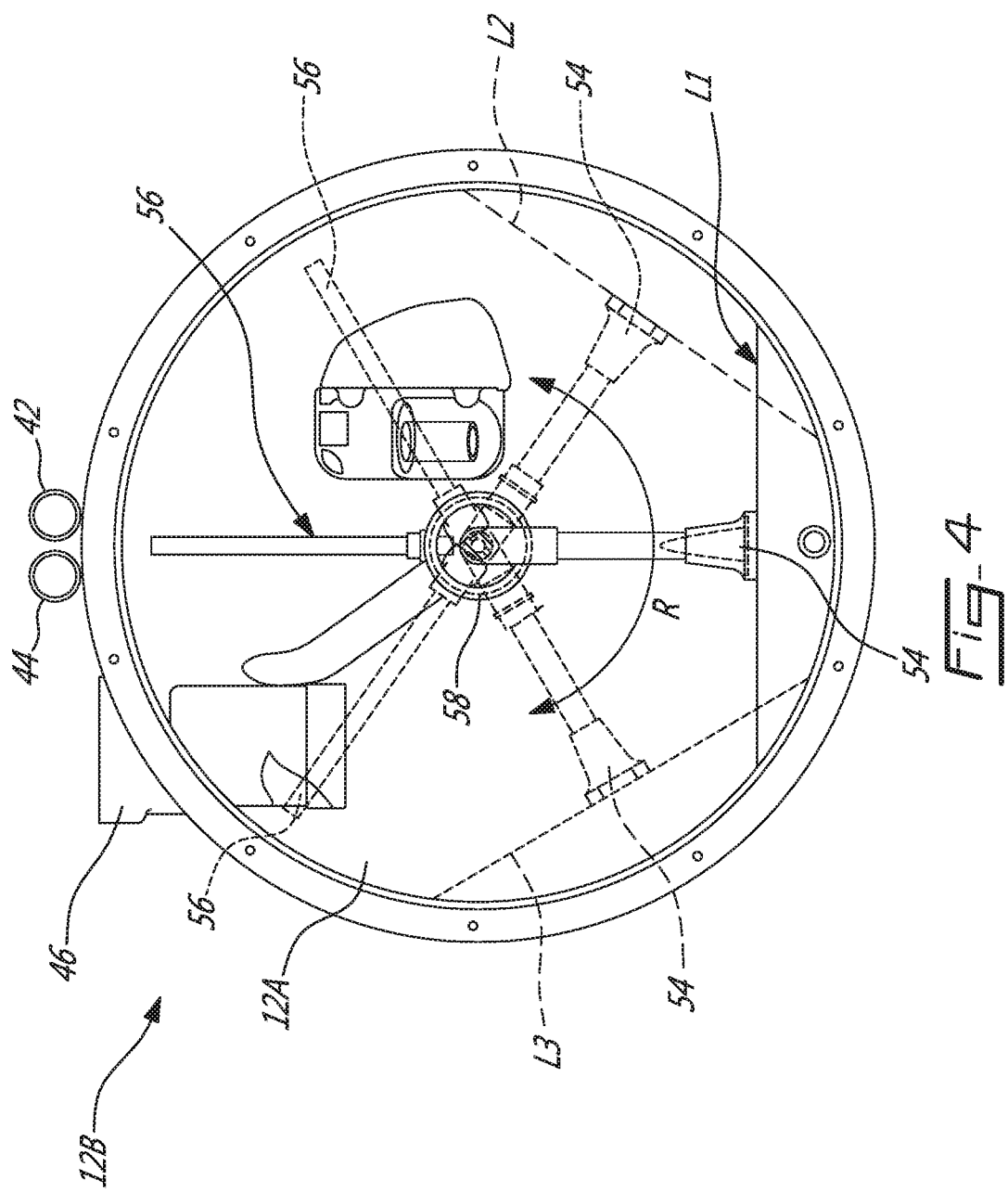

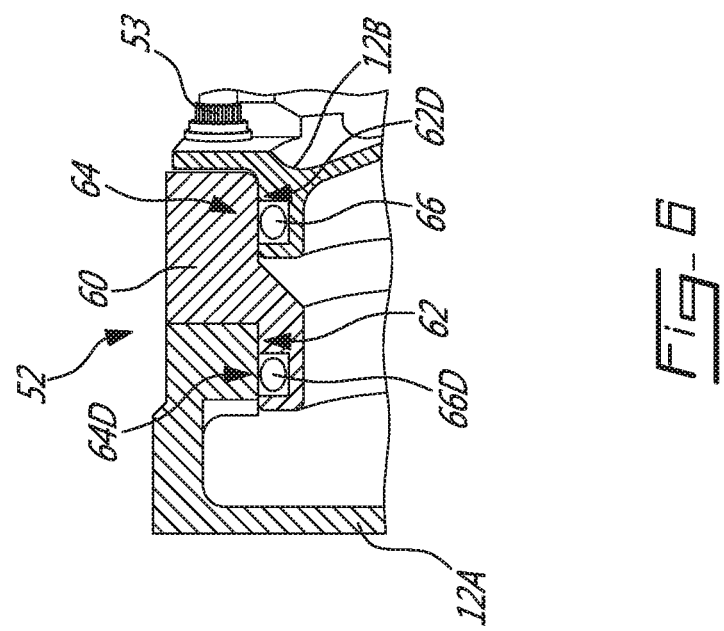
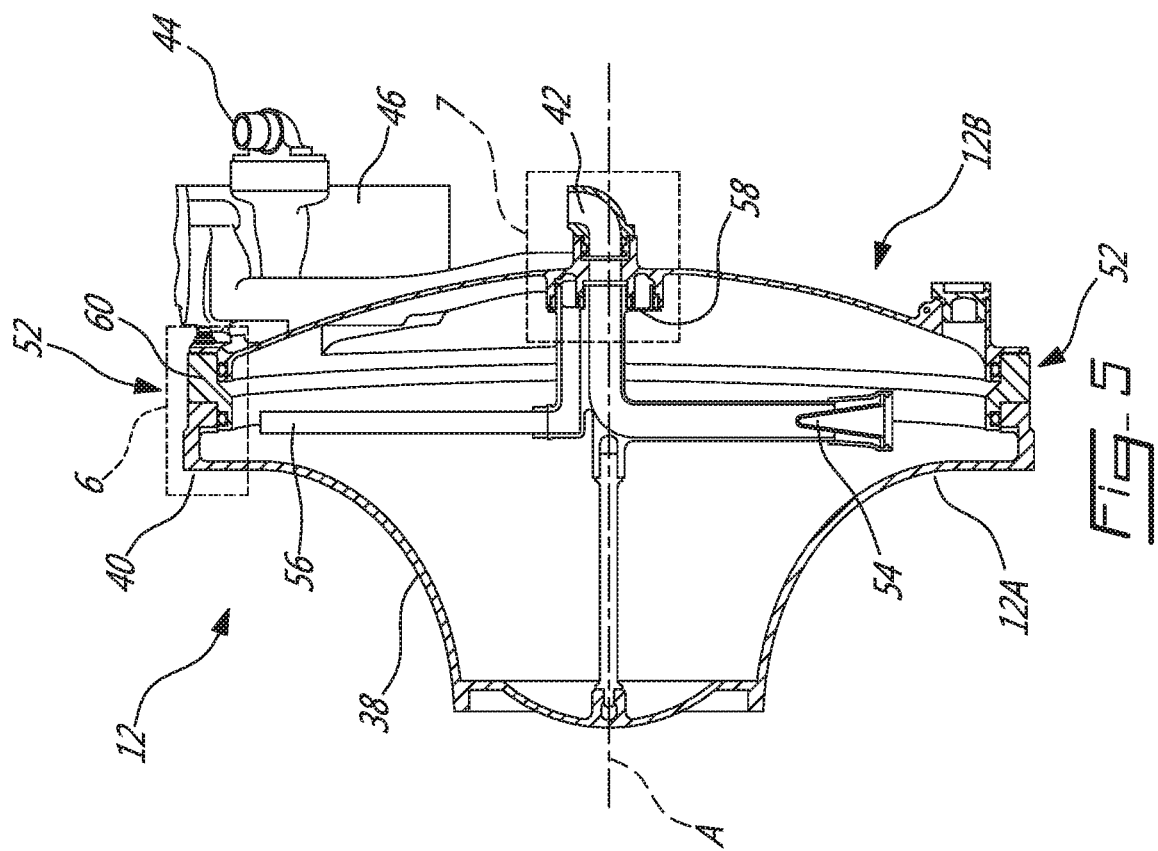

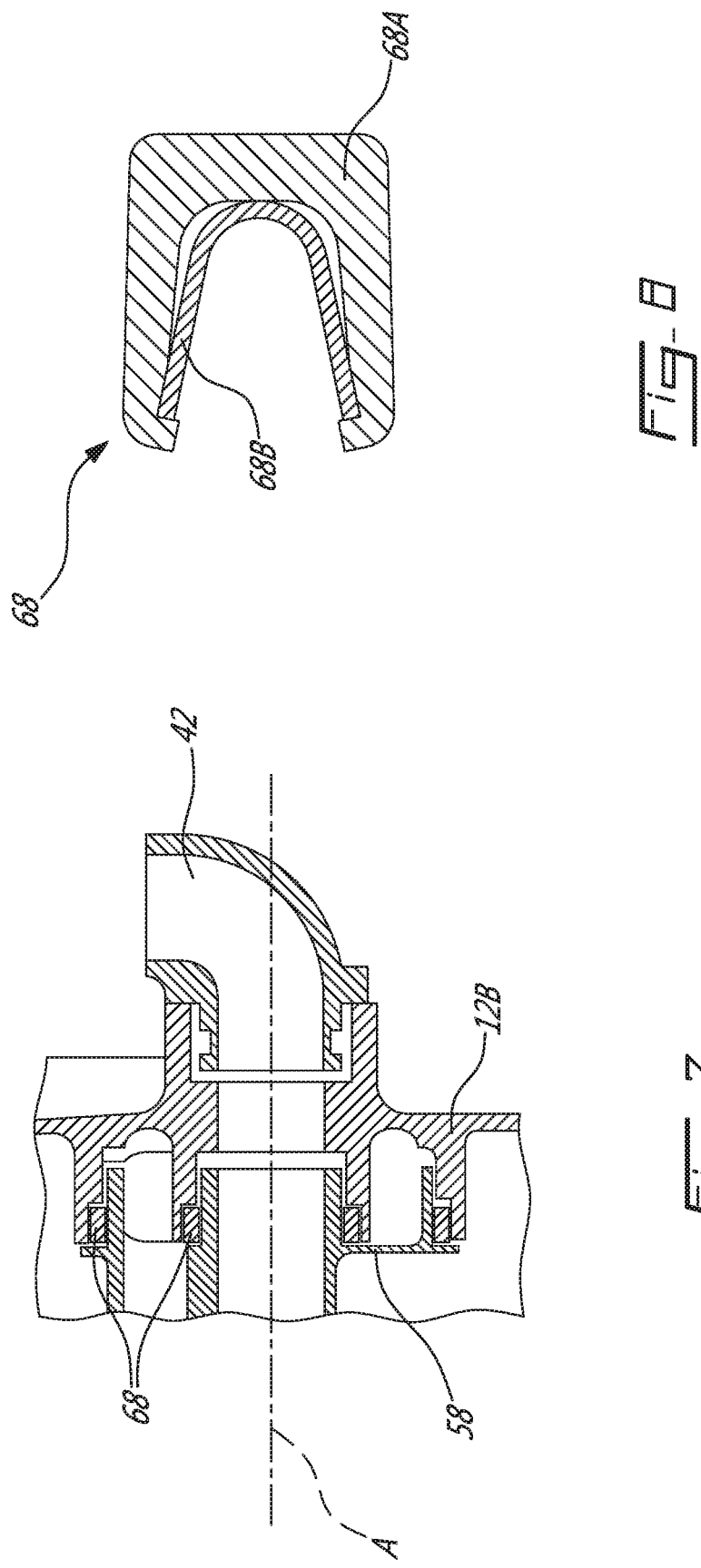

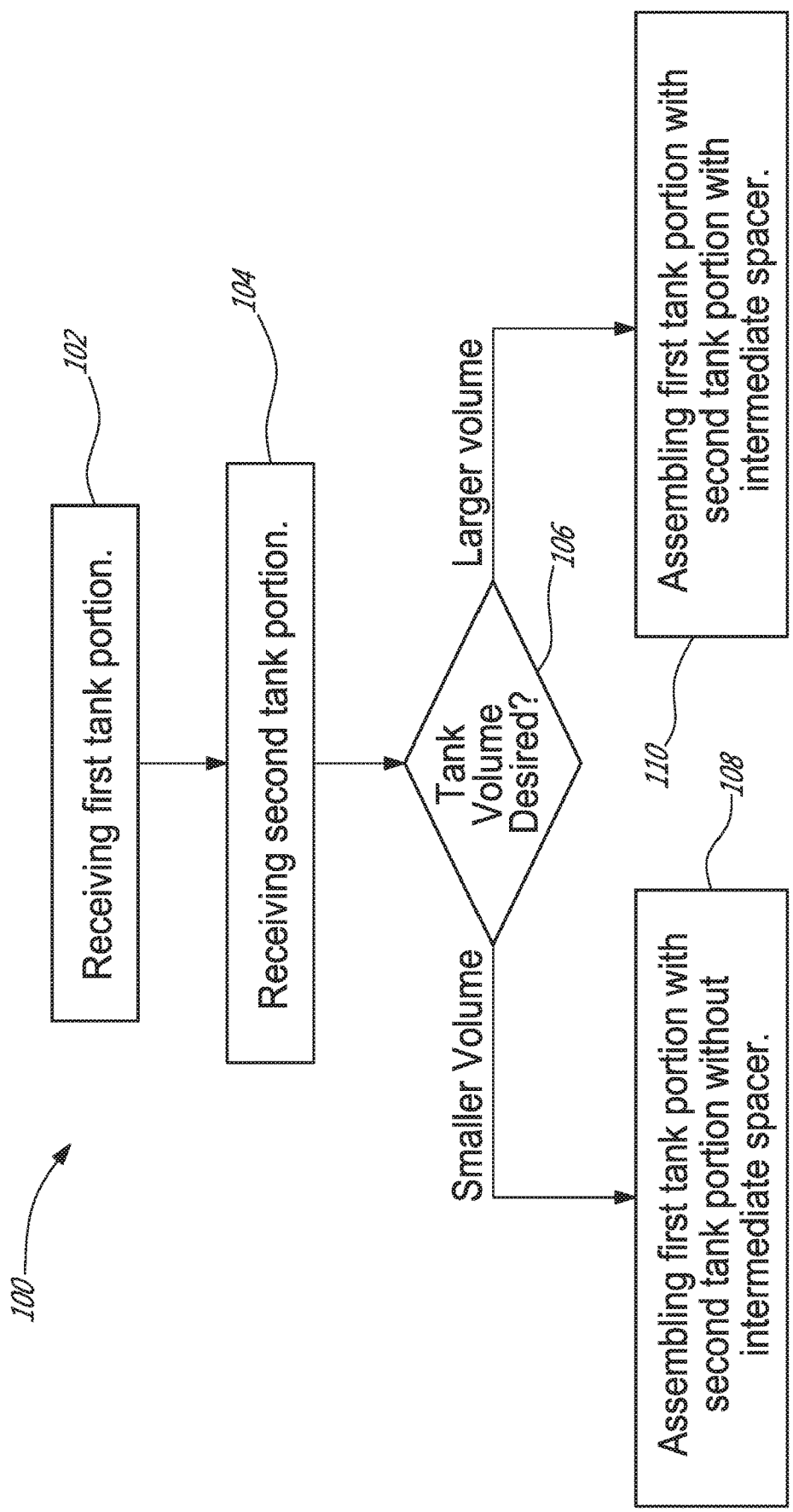

OIL TANK INSTALLATION IN GAS TURBINE ENGINE

TECHNICAL FIELD

The disclosure relates generally to gas turbine engines, and more particularly to oil tanks of gas turbine engines.

BACKGROUND OF THE ART

Gas turbine engines have oil systems to meet the lubrication and cooling needs of various components of the engine. An oil system in a gas turbine engine can include an oil supply system for delivering oil from an oil tank to various components within the gas turbine engine, and, an oil scavenging system for recovering used oil from the components in the engine and returning the recovered used oil back into the oil tank. The used oil that returns to the oil tank can carry some heat which can be transferred to other components of the engine that are near the oil tank. In some situations such heat transfer can have undesirable effects.

Improvement is desirable.

SUMMARY

In one aspect, the disclosure describes a gas turbine engine comprising:

an annular radial air inlet duct configured to receive a flow of air along a generally radially inward direction relative to an axis of the engine and direct the air toward a substantially axial direction relative to the axis, the annular radial air inlet duct comprising an inner duct wall defining a radially-inner space;

a compressor communicating with the annular radial air inlet duct; and an oil tank in communication with one or more engine lubrication loads, the oil tank being at least partially disposed in the radially-inner space.

The oil tank may comprise a tank wall facing the duct wall and spaced apart from the duct wall. The tank wall may be substantially axisymmetric about the axis. The axis may be an axis of rotation of the compressor.

The oil tank may have an outer periphery that is substantially circular when viewed along the axis.

A gap between the tank wall and the duct wall may be substantially uniform across at least a majority of the tank wall facing the duct wall.

The radially-inner space defined by the duct wall may be radially converging in a forward direction of the engine along the axis.

The gas turbine engine may be a reverse flow gas turbine engine.

The oil tank may be disposed aft of the compressor in the engine.

In some embodiments, the axis may be an axis of rotation of the compressor; the annular radial air inlet duct may be disposed aft of the compressor relative to the axis; and the oil tank may comprise a tank wall facing the duct wall and spaced apart from the duct wall.

The oil tank may comprise a forward tank portion assembled with an aft tank portion to cooperatively define an internal tank volume.

In some embodiments, the oil tank may comprise a forward tank portion and an aft tank portion; the forward tank portion may be configured to be assembled with the aft tank portion to cooperatively define an internal tank volume of a first size; and the forward tank portion may be configured to be assembled with the aft tank portion via an optional spacer disposed between the forward tank portion and the aft tank portion so that the forward tank portion, the aft tank portion and the spacer cooperatively define an internal tank volume greater than the first size.

Embodiments may include combinations of the above features.

In a further aspect, the disclosure describes an assembly for installation in a gas turbine engine. The assembly comprises:

an annular radial air inlet duct configured to receive a flow of air along a generally radially inward direction relative to an axis of the engine and direct the air toward a substantially axial direction relative to the axis and toward a compressor of the gas turbine engine, the annular radial air inlet duct comprising an inner duct wall defining a radially-inner space disposed centrally within the annular radial air inlet duct; and an oil tank at least partially disposed in the radially-inner space defined by the inner duct wall.

The oil tank may comprise a tank wall facing the duct wall and spaced apart from the duct wall. The tank wall may be substantially axisymmetric about the axis.

A gap between the tank wall and the duct wall may be substantially uniform across at least a majority of the tank wall facing the duct wall.

The axis may correspond to a central axis of the gas turbine engine when the radial air inlet duct is installed in the gas turbine engine and the radially-inner space is radially converging in a forward direction along the axis.

In some embodiments, the oil tank may comprise a forward tank portion and an aft tank portion; the forward tank portion may be configured to be assembled with the aft tank portion to cooperatively define an internal tank volume of a first size; and the forward tank portion may be configured to be assembled with the aft tank portion via an optional spacer disposed between the forward tank portion and the aft tank portion so that the forward tank portion, the aft tank portion and the spacer cooperatively define an internal tank volume greater than the first size.

Embodiments may include combinations of the above features.

In a further aspect, the disclosure describes an oil tank for installation in a gas turbine engine and configured to be at least partially disposed in a radially-inner space defined by an inner duct wall of an annular radial air inlet duct where the annular radial air inlet duct is configured to receive a flow of air along a generally radially inward direction relative to an axis of the engine and direct the air toward a substantially axial direction relative to the axis. The oil tank comprises a forward tank portion and an aft tank portion cooperatively defining an internal tank volume, the forward tank portion comprising a tank wall configured to face the inner duct wall and be spaced apart from the inner duct wall, the tank wall being substantially axisymmetric about the axis and at least partially conforming to a shape of the inner duct wall.

The forward tank portion and the aft tank portion may be assembled at a substantially circular interface.

Embodiments may include combinations of the above features.

In a further aspect, the disclosure describes an oil tank assembly for a gas turbine engine. The oil tank assembly comprises:

a first tank portion;

a second tank portion configured to be assembled with the first tank portion to cooperatively define an internal tank volume of a first size; and a spacer configured to be optionally disposed between the assembled first and second tank portions, the first and the second tank portions and the spacer when assembled together cooperatively defining an internal tank volume greater than the first size.

The first tank portion may comprise a tank wall that is substantially axisymmetric about an axis.

The first tank portion may have an outer periphery that is substantially circular when viewed along the axis.

In some embodiments, the first tank portion may comprise a first interfacing counterpart; the second tank portion may comprise a second interfacing counterpart configured to interface with the first interfacing counterpart; and the spacer may be disposed between the first interfacing counterpart and the second interfacing counterpart.

The first tank portion may comprise a tank wall that is substantially axisymmetric about an axis.

The first interfacing counterpart and the second interfacing counterpart may be substantially circular.

The first interfacing counterpart may comprise a first radially-inwardly-facing sealing surface relative to the axis.

The oil tank assembly may comprise a first compressible sealing member disposed between the first radially-inwardly-facing sealing surface of the first interfacing counterpart and the spacer.

The spacer may comprise a second radially-inwardly-facing sealing surface relative to the axis.

The oil tank assembly may comprise a second compressible sealing member disposed between the second radially-inwardly-facing sealing surface of the spacer and the second tank portion.

Embodiments may include combinations of the above features.

In a further aspect, the disclosure describes an oil tank kit. The kit comprises:

a first tank portion;

a second tank portion configured to be assembled with the first tank portion so that the first tank portion and the second tank portion cooperatively define an internal tank volume of a first size in a first configuration of the oil tank; and a spacer configured to be assembled between the first tank portion and the second tank portion so that the first tank portion, the second tank portion and the spacer cooperatively define an internal tank volume of a second size greater than the first size in a second configuration of the oil tank.

The first tank portion may comprise a first interfacing counterpart and the second tank portion comprises a second interfacing counterpart, the first interfacing counterpart and the second interfacing counterpart being substantially circular.

The first interfacing counterpart may comprise a first radially-inwardly-facing sealing surface.

The kit may comprise a first compressible sealing member configured to be disposed between the first radially-inwardly-facing sealing surface of the first interfacing counterpart and the spacer.

The spacer may comprise a second radially-inwardly-facing sealing surface.

The kit may comprise a second compressible sealing member configured to be disposed between the second radially-inwardly-facing sealing surface of the spacer and the second tank portion.

Embodiments may include combinations of the above features.

In a further aspect, the disclosure describes a method for assembling an oil tank. The method comprises:

receiving a first tank portion;

receiving a second tank portion;

conditioned upon a first internal tank volume of a first size being desired, assembling the first tank portion with the second tank portion so that the first tank portion and the second tank portion cooperatively define the first internal tank volume of the first size; and conditioned upon a second internal tank volume of a second size greater than the first size being desired, assembling the first tank portion with the second tank portion with an intermediate spacer disposed therebetween so that the first tank portion, the second tank portion and the intermediate spacer cooperatively define the second internal tank volume of the second size.

The method may comprise, conditioned upon the first internal tank volume of the first size being desired, placing a compressible sealing member between the first tank portion and the second tank portion.

The method may comprise, comprising, conditioned upon the second internal tank volume of the second size being desired, placing a compressible sealing member between the first tank portion and the intermediate spacer.

The method may comprise, conditioned upon the second internal tank volume of the second size being desired, placing a compressible sealing member between the intermediate spacer and the second tank portion.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 3 is a perspective view of the oil tank of FIG. 1;

FIG. 4 is a front view of the oil tank of FIG. 1 with a forward portion of the oil tank removed to show the interior of the oil tank;

FIG. 5 is an axial cross-section view of an exemplary oil tank according to another embodiment including an intermediate spacer disposed between a forward portion and an aft portion of the oil tank;

FIG. 6 is an enlarged view of region 6 in FIG. 5;

FIG. 7 is an enlarged view of region 7 in FIG. 5;

FIG. 8 is an enlarged cross-sectional view of an exemplary face seal; and

FIG. 9 is a flowchart illustrating a method for assembling an oil tank.

DETAILED DESCRIPTION

The present disclosure relates to oil tanks and their installation (e.g., packaging) in gas turbine engines. In some embodiments, the oil tanks disclosed herein may be configured to reduce the heat transfer to adjacent components such as air inlet ducts from the used oil in such oil tanks. In some embodiments, the oil tanks disclosed herein may be configured to be expandable so that oil tanks of different sizes may be assembled using common elements. Such expandable oil tanks may allow tanks of different sizes to be produced for similar gas turbine engines of different oil storage needs to be manufactured at lower costs using common elements. Methods of assembling oil tanks of different tank volumes are also disclosed herein.

Aspects of various embodiments are described through reference to the drawings.

Figure 1:
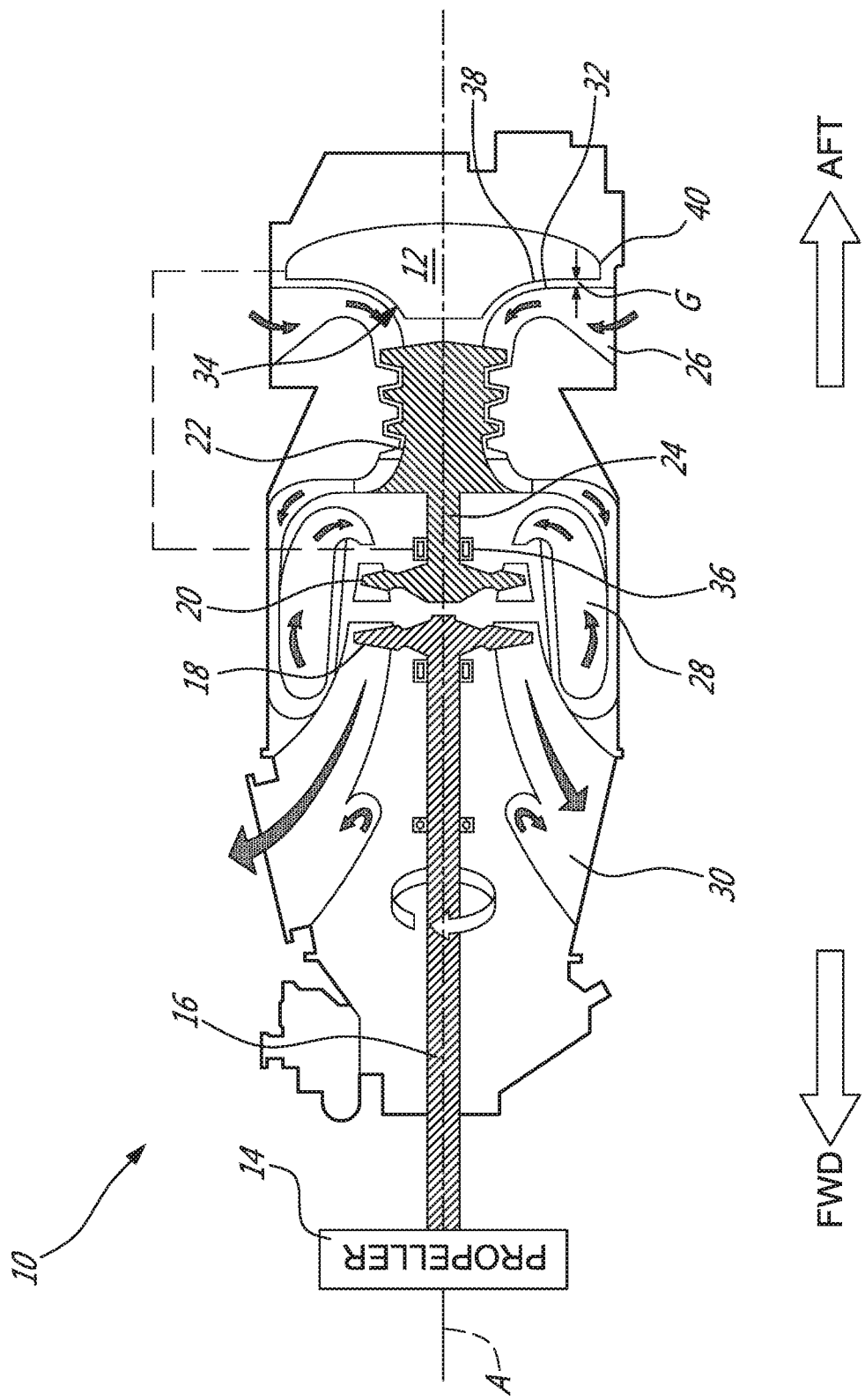
FIG. 1 is a schematic axial cross-section view of an exemplary reverse flow turboprop or turboshaft gas turbine engine comprising an exemplary oil tank as described herein.

FIG. 1 is a schematic axial cross-section view of an exemplary reverse flow turboprop or turboshaft gas turbine engine 10 comprising an exemplary oil tank 12 as described herein. Even though the following description and accompanying drawings specifically refer to a turboprop gas turbine engine as an example, it is understood that aspects of the present disclosure may be equally applicable to other types of gas turbine engines including turboshaft gas turbine engines. Gas turbine engine 10 may be of a type preferably provided for use in subsonic flight to drive a load such as propeller 14 via low-pressure shaft 16 (sometimes called "power shaft") coupled to low-pressure turbine 18. Low-pressure turbine 18 and low-pressure shaft 16 may be part of a first spool of gas turbine engine 10 known as a low-pressure spool. Gas turbine engine 10 may comprise a second or high-pressure spool comprising high pressure turbine 20, (e.g., multistage) compressor 22 and high pressure shaft 24.

Compressor 22 may draw ambient air into engine 10 via annular radial air inlet duct 26, increase the pressure of the drawn air and deliver the pressurized air to combustor 28 where the pressurized air is mixed with fuel and ignited for generating an annular stream of hot combustion gas(es) (referred hereinafter in the singular). High-pressure turbine 20 may extract energy from the hot expanding combustion gas and thereby drive compressor 22. The hot combustion gas leaving high-pressure turbine 20 may be accelerated as it further expands, flows through and drives low pressure turbine 18. The combustion gas may then exit gas turbine engine 10 via exhaust duct 30.

The flow of air through gas turbine engine 10 may be generally toward a forward direction (see "FWD" shown in FIG. 1) of gas turbine engine 10 where annular air inlet duct 26 may be disposed in a portion of gas turbine engine 10 that is aft (see "AFT" direction shown in FIG. 1) of combustor 28 and outlet duct 30 may be disposed in a portion of gas turbine engine 10 forward of combustor 28. Inlet duct 26 may be secured to suitable structure (e.g., casing) of gas turbine engine 10. Compressor 22 may be disposed aft of low pressure turbine 18. The FWD direction illustrated in FIG. 1 may correspond to a direction of travel of gas turbine engine 10 when gas turbine engine 10 is mounted to an aircraft and configured as a turboprop engine. The exemplary configuration of gas turbine engine 10 shown in FIG. 1 may be referred to as a reverse-flow free turbine engine in relation to the general flow direction (in the FWD direction) in the gas path during operation of gas turbine engine 10.

Air inlet duct 26 may have a generally annular shape and be of the "radial" type where it may be configured to receive a flow of ambient air along a generally radially inward direction relative to axis A of gas turbine engine 10 and direct the air toward a substantially axial direction relative to axis A. In some embodiments, axis A may substantially correspond to a central axis of gas turbine engine 10. In some embodiments, axis A may substantially correspond to an axis of rotation of compressor 22. In some embodiments, axis A may substantially correspond to an axis of rotation of the high-pressure spool comprising compressor 22, high-pressure shaft 24 and of high-pressure turbine 20. In some embodiments, axis A may substantially correspond to an axis of rotation of the low-pressure spool comprising low-pressure turbine 18 and low-pressure shaft 16. In some embodiments, axis A may substantially correspond to an axis of rotation of both the high-pressure spool and the low-pressure spool.

Annular air inlet duct 26 may comprise inner duct wall 32 defining a radially-inner (i.e., central) space 34 external to inlet duct 26. In some embodiments, inner duct wall 32 may be substantially axisymmetric about axis A. For example, radially-inner space 34 may be defined by an outer/aft surface of duct wall 32, where the outer/aft surface is a revolved surface about axis A. In some embodiments, radially-inner space 34 may be radially converging in a first direction along axis A. For example, the duct wall 32 may be shaped to direct the flow of ambient air from a substantially radial direction toward a substantially axial (e.g., forward) direction toward compressor 22. For example, the outer surface of duct wall 32 at an upstream location may be generally aft-facing and the outer surface of duct wall 32 at a more downstream location may face more radially inwardly relative to axis A. Accordingly, the radially-inner space 34 may have a radially outer dimension that that diminishes in a forward direction along axis A. For example, a first radially outer dimension (e.g., diameter) of radially-inner space 34 at a first axial position along axis A may be smaller than a second radially outer dimension (e.g., diameter) of radially-inner space 34 at a second axial position along axis A that is aft of the first axial position.

Oil tank 12 may be part of a suitable oil system of gas turbine engine 10 and may be in communication with one or more components 36 (i.e., engine lubrication loads) (referred hereinafter in the singular) such as bearings and/or gears for example. Oil tank 12 may be connected to an oil distribution system where oil from inside of oil tank 12 may be delivered to component 36, and, may be connected to an oil scavenging system where used oil is returned from component 36 to oil tank 12. Oil tank 12 may be secured to suitable structure (e.g., casing) of gas turbine engine 10.

Oil tank 12 may be at least partially disposed in radially-inner space 34 defined by inner duct wall 32 while being a separate component from air inlet duct 26. Oil tank 12 may be disposed aft of compressor 22. For example, oil tank 12 may be shaped and configured to occupy at least some of radially-inner space 34 to provide an efficient use of radially-inner space 34. For example, oil tank 12 may have tank wall 38 that may be shaped to at least partially conform to the shape of duct wall 32 to provide efficient packaging with air inlet duct 26. In some embodiments, tank wall 38 may be opposite (i.e., face) duct wall 32 and be spaced apart from duct wall 32 by air gap G. Air gap G may provide some thermal isolation between tank wall 38 and duct wall 32 to reduce an amount of heat that may be transferred from the oil inside of oil tank 12 to air inlet duct 26. For example, air gap G may substantially prevent conductive heat transfer from tank wall 38 to duct wall 32. The size of air gap G may be selected to provide the desired thermal isolation while still providing efficient use of radially-inner space 34. The presence of air gap G may be desirable in some situations where it is preferable not to add heat to the ambient air being directed toward compressor 22 by air inlet duct 26. In some embodiments, the size of air gap G may be between about 0.05 inch (1.3 mm) and 0.25 inch (6.4 mm). In some embodiments, the size of air gap G may be between about 0.04 inch (1 mm) and 0.25 inch (6.4 mm). It is understood that an air gap G that is smaller than 0.05 inch (1.3 mm) or that is greater than 0.25 inch (6.4 mm) may be suitable in some embodiments.

The shape of tank wall 38 may be generally similar to the shape of duct wall 32. For example, in some embodiments, the shape of tank wall 38 may substantially correspond to an outward offset of the shape of duct wall 32 that is opposite tank wall 38. Accordingly, air gap G may be substantially uniform across some or substantially all of tank wall 38 facing duct wall 32. In some embodiments, air gap G between tank wall 38 and duct wall 32 may be substantially uniform across at least a majority of tank wall 38 facing duct wall 32. Therefore, in some embodiments, tank wall 38 may be substantially axisymmetric about axis A. Oil tank 12 may have outer periphery 40 that is substantially circular when viewed along axis A.

Figure 2:
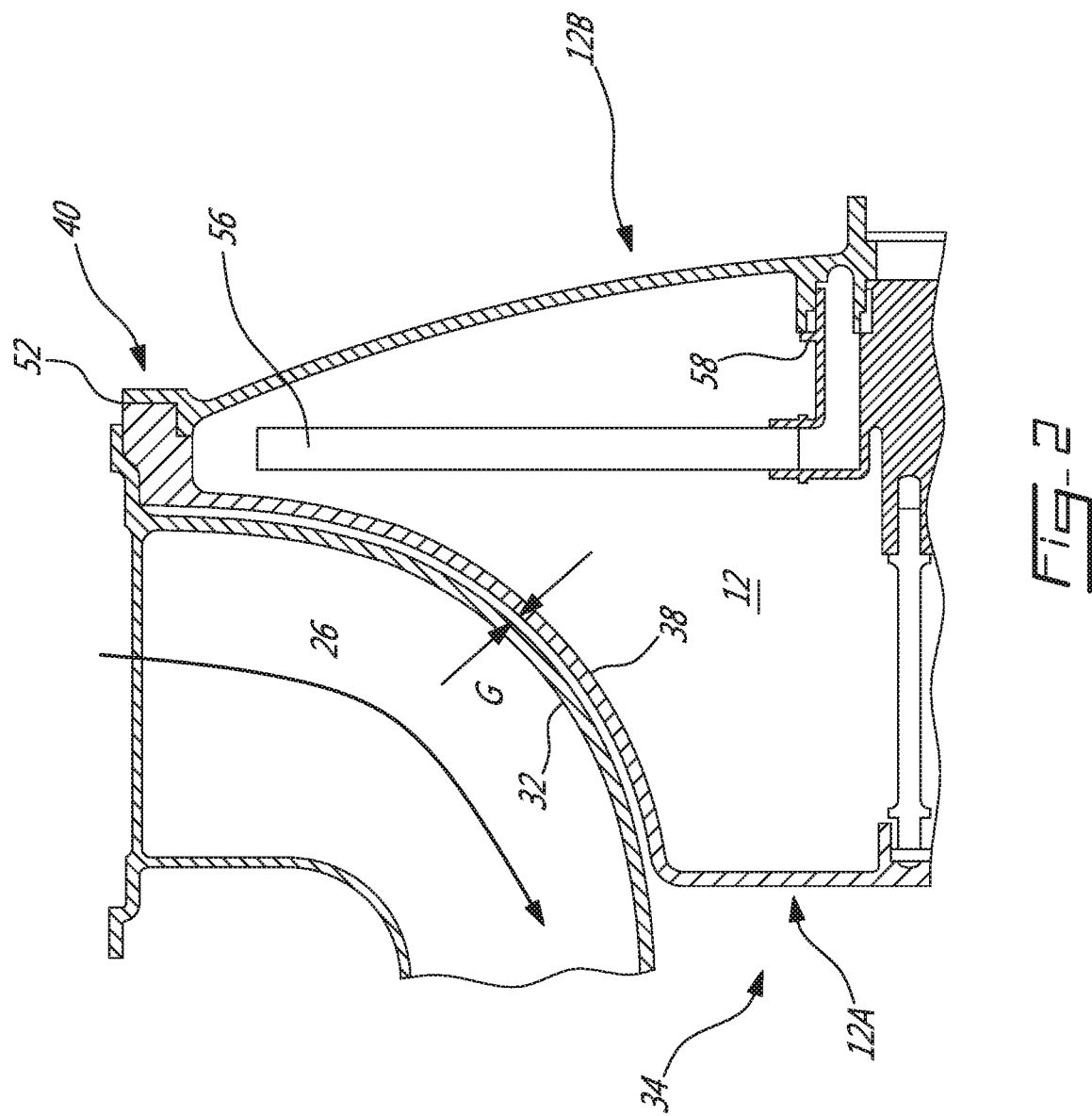
FIG. 2 is a partial axial cross-section view of the oil tank installed in the engine of FIG. 1 in relation to an annular radial air inlet duct of the engine.

FIG. 2 is an enlarged partial axial cross-section view of oil tank 12, with some details omitted for clarity, installed in the engine of FIG. 1 where oil tank 12 is adjacent air inlet duct 26. FIG. 2 illustrates an exemplary embodiment where air gap G is substantially uniform across tank wall 38 which is facing duct wall 32. The relationship between air inlet duct 26 and oil tank 12 may promote efficient use of space while air gap G may provide a barrier to heat transfer from the oil in oil tank 12 to air inlet duct 26.

FIG. 3 is a perspective view of oil tank 12 showing mainly an aft side of oil tank 12. The internal tank volume of oil tank 12 may be in communication with components 36 via oil delivery line 42 through which oil from oil tank 12 is delivered to components 36, and, also via oil return line 44 through which used oil from components 36 is returned to oil tank 12. Used oil returning to oil tank 12 may pass through a suitable de-aerator configured to remove at least some gas/air bubbles from the used oil prior to the used oil entering the internal tank volume. Oil tank 12 may comprise oil filler port 48 and oil level indicator 50 which may be a visual indicator such as a sight glass or may be a suitable oil level sensor operatively coupled to a remote visual indicator located in a cockpit of an aircraft for example.

In some embodiments, oil tank 12 may comprise first (e.g., forward) tank portion 12A assembled with second (e.g., aft) tank portion 12B where first tank portion 12A and second tank portion 12B cooperatively define the internal tank volume of oil tank 12. First tank portion 12A and second tank portion 12B may comprise separate parts that are assembled together to form oil tank 12. For example, first tank portion 12A and second tank portion 12B may be sealingly secured together at interface 52. In some embodiments, interface 52 may be substantially circular. In some embodiments, first tank portion 12A and second tank portion 12B may be detachably secured together. For example, first tank portion 12A and second tank portion 12B may be secured together via one or more threaded fasteners 53. In some embodiments, first tank portion 12A and second tank portion 12B may be secured together via a plurality of fasteners 53 (e.g., bolts) circumferentially distributed about interface 52. In some embodiments, interface 52 may be disposed at or near outer periphery 40 of oil tank 12. Tank wall 38 facing duct wall 32 may be part of first tank portion 12A.

FIG. 4 is a front view of oil tank 12 with first tank portion 12A of oil tank 12 removed to show the interior of oil tank 12. The circular design of oil tank 12 may make efficient use of the oil so that different orientations of oil tank 12 may be accommodated without requiring an excessive amount of oil (i.e., weight) inside of oil tank 12. For example, oil tank 12 may be suitable for use on aircraft that may routinely experience relatively large amounts of roll or lateral accelerations which would cause the quantity of oil inside of oil tank 12 to shift. For example, oil tank 12 may be suitable for aerobatics applications.

Oil tank 12 may comprise inlet tube 54 for drawing oil from the interior of oil tank 12 and directing the oil to components 36 via oil delivery line 42. Oil tank 12 may also comprise venting tube 56 for venting the interior of oil tank 12. Inlet tube 54 and venting tube 56 may both be mounted to common central hub 58 pivotally mounted inside of oil tank 12 and adapted for free rotation as a unit about axis A. Both inlet tube 54 and venting tube 56 may be in communication with respective oil delivery line 42 and a suitable vent via respective channels extending through hub 58. Inlet tube 54 and venting tube 56 may be mounted to hub 58 in a diametrically opposed relationship.

FIG. 4 shows a minimum oil level L1 as a solid line in a first condition/orientation of oil tank 12 in which the oil has gathered at the bottom of oil tank 12. FIG. 4 also shows oil levels L2 and L3 as stippled lines corresponding to different respective conditions/orientations causing the quantity of oil inside of oil tank 12 to shift. Oil levels L2 and L3 may be associated with respective roll maneuvers of an aircraft to which gas turbine engine 10 is mounted or may be associated with respective lateral accelerations experienced by the aircraft.

FIG. 4 also shows the orientations of inlet tube 54 and diametrically opposed venting tube 56 at three orientations associated with the operating conditions under which oil levels L1-L3 would be encountered. The orientation of inlet tube 54 and venting tube 56 associated with oil level L1 is shown in solid lines and the respective orientations of inlet tube 54 and venting tube 56 associated with oil levels L2 and L3 are shown in stippled lines. Inlet tube 54 and venting tube 56 may be constructed so that inlet tube 54 is heavier than venting tube 56 so that inlet tube 54 may always be in communication with the quantity of oil inside of oil tank 12 so long as the quantity of oil is equal to or greater than oil levels L1, L2 and L3. The free rotation of hub 58 in conjunction with the inlet tube 54 being heavier than venting tube 56 may cause hub 58 to rotate in response to roll maneuvers or to lateral accelerations in a manner that causes inlet tube 54 to follow the quantity of oil that is shifting inside of oil tank 12. This may prevent inlet tube 54 from being starved of oil due to shifting of the quantity of oil and also eliminate the need to carry extra oil (i.e., weight) inside of oil tank 12 to compensate for such shifting.

The free rotation of hub 58 about axis A may, for example, be achieved via relatively low friction coupling of hub 58 to aft tank portion 12B. In addition to rotating in response to acceleration, hub 58 may also rotate due to friction of the oil on inlet tube 54 that may entrain inlet tube 54 to follow the quantity of oil as the quantity of oil shifts inside of oil tank 12.

FIG. 5 is an axial cross-section view of an exemplary oil tank 12 according to another embodiment. The oil tank 12 of FIG. 5 may comprise all of the elements illustrated in previous figures and described above and may additionally include an optional intermediate spacer 60 disposed between first (e.g., forward) portion 12A and second (e.g., aft) portion 12B of oil tank 12. FIG. 5 shows a configuration of oil tank 12 that has been expanded to have a larger internal volume through the use of intermediate spacer 60. As mentioned above, oil tank 12 may be configured to be assembled in different configurations to have different internal volumes using common elements. Accordingly, identical components may be used to produce tanks of different internal volumes in an efficient and economical manner. Oil tanks 12 of different sizes may, for example, be used in engines of the same family or in engines that have different lubrication requirements but that are otherwise substantial identical.

First tank portion 12A of oil tank 12 may be configured to be assembled with second tank portion 12B without intermediate spacer 60 so that first tank portion 12A and aft tank portion 12B may cooperatively define an internal tank volume of a first size in a first configuration of oil tank 12. However, first tank portion 12A may also be configured to be assembled with second tank portion 12B via intermediate spacer 60 disposed between first tank portion 12A and second tank portion 12B so that first tank portion 12A, second tank portion 12B and intermediate spacer 60 may cooperatively define an internal tank volume of a second size in a second configuration of oil tank 12. The second size of the second configuration of oil tank 12 may be greater than the first size of the first configuration of oil tank 12. Optional intermediate spacer 60 may be sealingly assembled between first tank portion 12A and second tank portion 12B and may serve as an interface therebetween. Accordingly, intermediate spacer 60 may have an annular shape conforming substantially to the shape of interface 52.

FIG. 6 is an enlarged detailed view of region 6 in FIG. 5 showing the interfacing between first tank portion 12A, intermediate spacer 60 and second tank portion 12B. In a first configuration of oil tank 12 without intermediate spacer 60, first interfacing counterpart 62 of first tank portion 12A may interface directly with second interfacing counterpart 64 of second tank portion 12B. In some embodiments, first interfacing counterpart 62 may comprise a radially-inwardly-facing sealing surface that is configured to cooperated with sealing member 66 in order to provide a suitable seal between first tank portion 12A and second tank portion 12B. First interfacing counterpart 62 and second interfacing counterpart 64 may be substantially circular and may be substantially coaxial with axis A. In some embodiments, sealing member 66 may be a suitable compressible sealing member. In some embodiments, sealing member 66 may be an O-ring.

In a second (e.g., larger) configuration of oil tank 12, intermediate spacer 60 may be disposed between first interfacing counterpart 62 and second interfacing counterpart 64. Intermediate spacer 60 may cause first tank portion 12A and second tank portion 12B to be spaced apart in order to define a larger internal volume of oil tank 12. Intermediate space 60 may be of any suitable size to provide the desired internal volume of oil tank 12. In some embodiments, intermediate spacer 60 may be configured to interface directly with the existing first interfacing counterpart 62 and second interfacing counterpart 64 so that no significant modifications to first tank portion 12A and/or to second tank portion 12B may be required to accommodate interfacing spacer 60.

In some embodiments, intermediate spacer 60 may be configured to provide axial spacing between first tank portion 12A and second tank portion 12B and also duplicate the appropriate interfacing counterparts. For example, intermediate spacer 60 may comprise duplicate first interfacing counterpart 62D for interfacing with second interfacing counterpart 64, and, intermediate spacer 60 may comprise duplicate second interfacing counterpart 64D for interfacing with first interfacing counterpart 62. Duplicate first interfacing counterpart 62D may comprise a radially-inwardly-facing sealing surface that is configured to cooperate with sealing member 66 of second interfacing counterpart 64 in order to provide a suitable seal between second tank portion 12B and intermediate spacer 60. Similarly, the radially-inwardly-facing sealing surface of the first interfacing counterpart 62 may be configured to cooperated with duplicate sealing member 66D of duplicate second interfacing counterpart 64D in order to provide a suitable seal between first tank portion 12A and intermediate spacer 60. In this embodiment, fasteners 53 (e.g., bolts) may extend through second tank portion 12B, through intermediate spacer 60 and be threaded into first tank portion 12A.

In some embodiments, the oil tank 12 may be provided as a kit so that oil tanks of different sizes may be produced using common elements. For example, such kit may comprise first tank portion 12A, second tank portion 12B and one or more intermediate spacers 60. Second tank portion 12B may be configured to be assembled with first tank portion 12A so that first tank portion 12A and second tank portion 12B may cooperatively define an internal tank volume of a first size in a first configuration of oil tank 12. The kit may comprise one intermediate spacer 60 or a plurality of intermediate spacers 60 to provide the option of assembling oil tanks 12 of different sizes using common elements. As explained above, intermediate spacer 60 may be configured to be assembled between first tank portion 12A and second tank portion 12B so that first tank portion 12A, second tank portion 12B and intermediate spacer 60 cooperatively define an internal tank volume of a second size that is greater than the first size in a second configuration of oil tank 12. The kit may also comprise fasteners 53 of appropriate length for the size of intermediate spacer 60.

In some embodiments, such kit may comprise a first compressible sealing member 66D configured to be disposed between a first radially-inwardly-facing sealing surface of first interfacing counterpart 62 and intermediate spacer 60.

In some embodiments such kit may comprise a second compressible sealing member 66 configured to be disposed between a second radially-inwardly-facing sealing surface of duplicate first interfacing counterpart 62D provided by intermediate spacer 60 and second tank portion 12B.

It is understood that other arrangements for establishing a seal between intermediate spacer 60, first tank portion 12A and second tank portion 12B may be suitable. For example, another arrangement could include using suitable sealing members between opposite axially-facing surfaces of intermediate spacer 60 with respective first tank portion 12A and second tank portion 12B instead of or in addition to sealing members 66 and 66D.

FIG. 7 is an enlarged view of region 7 in FIG. 5. The free rotation of hub 58 about axis A relative to second tank portion 12B may, for example, be achieved via relatively low friction annular face seals 68 interposed between hub 58 and second tank portion 12B. In some embodiments, face seals 68 may serve to support hub 58 within a receptacle which may be part of or secured to second tank portion 12B, and, also provide a sealing function.

FIG. 8 is a cross-sectional view of an exemplary embodiment of annular face seal(s) 68 suitable to be disposed between hub 58 and second tank portion 12B of FIG. 7. Face seal 68 may comprise seal jacket 68A made of an elastomeric material and energizer (e.g., metallic spring) 68B disposed inside of seal jacket 68A. Other types of seals may be suitable.

FIG. 9 is a flowchart illustrating a method 100 for assembling an oil tank such as, for example, oil tank 12 as disclosed herein. Method 100 may be used to assemble oil tanks 12 of different internal volumes using common elements. In some embodiments, method 100 may comprise receiving first (e.g., forward) tank portion 12A (e.g., see block 102) and receiving second (e.g., aft) tank portion (e.g., see block 104). In various embodiments, first tank portion 12A may be assembled with second tank portion 12B with or without intermediate spacer 60 depending on the size of oil tank 12 desired. For example, conditioned upon a first internal tank volume of a first size being desired (e.g., see block 106), assembling first tank portion 12A with second tank portion 12B so that first tank portion 12A and second tank portion 12B cooperatively define the first internal tank volume of the first size (e.g., see block 108). Alternatively, conditioned upon a second internal tank volume of a second size greater than the first size being desired (e.g., see block 106), assembling first tank portion 12A with second tank portion 12B with intermediate spacer 60 disposed therebetween so that first tank portion 12A, second tank portion 12B and intermediate spacer 60 cooperatively define the second internal tank volume of the second size (e.g., see block 110).

In some embodiments, conditioned upon the first internal tank volume of the first size being desired, method 100 may comprise placing compressible sealing member 66 between first tank portion 12A and second tank portion 12B so that first interfacing counterpart 62 of first tank portion 12A may interface directly with second interfacing counterpart 64 of second tank portion 12B.

In some embodiments, conditioned upon the second internal tank volume of the second size being desired, method 100 may comprise placing compressible sealing member 66D between first tank portion 12A and intermediate spacer 60 so that first interfacing counterpart 62 of first tank portion 12A may interface with duplicate second interfacing counterpart 64D of intermediate spacer 60.

In some embodiments, conditioned upon the second internal tank volume of the second size being desired, method 100 may comprise placing compressible sealing member 66 between intermediate spacer 60 and second tank portion 12B so that duplicate first interfacing counterpart 62D of intermediate spacer 60 may interface with second interfacing counterpart 64 of second tank portion 12B.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A gas turbine engine comprising:
an annular radial air inlet duct configured to receive a flow of air along a generally radially inward direction relative to an axis of the engine and direct the air toward a substantially axial direction relative to the axis, the annular radial air inlet duct comprising an inner duct wall defining a radially-inner space having a radially outer dimension that diminishes in the axial direction;
a compressor communicating with the annular radial air inlet duct; and
an oil tank in communication with one or more engine lubrication loads, wherein:
the oil tank is at least partially disposed in the radially-inner space;
the oil tank has an interior tank volume that intersects the axis at an axial location within the radially-inner space;
the oil tank has a tank wall that is spaced apart from the duct wall and that faces the duct wall;
the tank wall is substantially axisymmetric about the axis; and
the tank wall defines a radially-outer dimension of the oil tank that diminishes in the axial direction to at least partially conform to a shape of the duct wall.

2. The gas turbine engine as defined in claim 1, wherein the axis is an axis of rotation of the compressor.

3. The gas turbine engine as defined in claim 1, wherein the oil tank has an outer periphery that is substantially circular when viewed along the axis.

4. The gas turbine engine as defined in claim 1, wherein a gap between the tank wall and the duct wall is substantially uniform across at least a majority of the tank wall facing the duct wall.

5. The gas turbine engine as defined in claim 1, wherein the radially-inner space defined by the duct wall is radially converging in a forward direction of the engine along the axis.

6. The gas turbine engine as defined in claim 1, wherein the gas turbine engine is a reverse flow gas turbine engine.

7. The gas turbine engine as defined in claim 1, wherein the oil tank is disposed aft of the compressor in the engine.

8. The gas turbine engine as defined in claim 1, wherein:
the axis is an axis of rotation of the compressor; and
the annular radial air inlet duct is disposed aft of the compressor relative to the axis.

9. The gas turbine engine as defined in claim 8, wherein the oil tank comprises a forward tank portion assembled with an aft tank portion to cooperatively define the internal tank volume.

10. The gas turbine engine as defined in claim 8, wherein:
the oil tank comprises a forward tank portion and an aft tank portion;
the forward tank portion is configured to be assembled with the aft tank portion to cooperatively define an internal tank volume of a first size; and
the forward tank portion is configured to be assembled with the aft tank portion via an optional spacer disposed between the forward tank portion and the aft tank portion so that the forward tank portion, the aft tank portion and the spacer cooperatively define an internal tank volume greater than the first size.

11. The gas turbine engine as defined in claim 1, wherein a gap between the tank wall and the duct wall extends across substantially all of the tank wall.

12. An assembly for installation in a gas turbine engine, the assembly comprising:
an annular radial air inlet duct configured to receive a flow of air along a generally radially inward direction relative to an axis of the engine and direct the air toward a substantially axial direction relative to the axis and toward a compressor of the gas turbine engine, the annular radial air inlet duct comprising an inner duct wall defining a radially-inner space disposed centrally within the annular radial air inlet duct, the radially-inner space having a radially outer dimension that diminishes in the axial direction; and
an oil tank at least partially disposed in the radially-inner space defined by the inner duct wall, the oil tank having an interior tank volume that intersects the axis at an axial location within the radially-inner space, the oil tank having a tank wall that is spaced apart from the duct wall and that faces the duct wall, the tank wall being substantially axisymmetric about the axis, the tank wall defining a radially-outer dimension of the oil tank that diminishes in the axial direction to at least partially conform to a shape of the duct wall.

13. The assembly as defined in claim 12, wherein a gap between the tank wall and the duct wall is substantially uniform across at least a majority of the tank wall facing the duct wall.

14. The assembly as defined in claim 13, wherein the axis corresponds to a central axis of the gas turbine engine when the radial air inlet duct is installed in the gas turbine engine and the radially-inner space is radially converging in a forward direction along the axis.

15. The assembly as defined in claim 12, wherein:
the oil tank comprises a forward tank portion and an aft tank portion;
the forward tank portion is configured to be assembled with the aft tank portion to cooperatively define an internal tank volume of a first size; and
the forward tank portion is configured to be assembled with the aft tank portion via an optional spacer disposed between the forward tank portion and the aft tank portion so that the forward tank portion, the aft tank portion and the spacer cooperatively define an internal tank volume greater than the first size.

16. An oil tank for installation in a gas turbine engine and configured to be at least partially disposed in a radially-inner space defined by an inner duct wall of an annular radial air inlet duct where the annular radial air inlet duct is configured to receive a flow of air along a generally radially inward direction relative to an axis of the engine and direct the air toward a substantially axial direction relative to the axis, the radially-inner space wall having a radially outer dimension that diminishes in the axial direction, the oil tank comprising:
a forward tank portion and an aft tank portion cooperatively defining an internal tank volume that intersects the axis when installed in the gas turbine engine, the forward tank portion comprising a tank wall configured to face the inner duct wall and be spaced apart from the inner duct wall, the tank wall being substantially axisymmetric about the axis, the tank wall defining a radially-outer dimension of the oil tank that diminishes in the axial direction to at least partially conform to a shape of the inner duct wall.

17. The oil tank as defined in claim 16, wherein the forward tank portion and the aft tank portion are assembled at a substantially circular interface.

* * * * *